United States Patent
Kang et al.

(10) Patent No.: US 8,949,424 B2
(45) Date of Patent: Feb. 3, 2015

(54) CONTENT INFORMATION PROVIDING AND REPRODUCING METHOD AND APPARATUS

(75) Inventors: Young-soo Kang, Seoul (KR);
Kwang-hyuk Kim, Suwon-si (KR);
Jung-shin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 12/561,523

(22) Filed: Sep. 17, 2009

(65) Prior Publication Data
US 2010/0185765 A1   Jul. 22, 2010

(30) Foreign Application Priority Data
Jan. 21, 2009   (KR) ........................ 10-2009-0005158

(51) Int. Cl.
| | | |
|---|---|---|
| G06F 15/173 | (2006.01) | |
| G06F 15/16 | (2006.01) | |
| H04L 12/28 | (2006.01) | |
| H04N 21/235 | (2011.01) | |
| H04N 21/2368 | (2011.01) | |
| H04N 21/2389 | (2011.01) | |
| H04N 21/435 | (2011.01) | |
| H04N 21/4385 | (2011.01) | |

(Continued)

(52) U.S. Cl.
CPC .......... *H04L 12/2812* (2013.01); *H04N 21/235* (2013.01); *H04N 21/2368* (2013.01); *H04N 21/2389* (2013.01); *H04N 21/435* (2013.01); *H04N 21/4385* (2013.01); *H04N 21/8173* (2013.01); *H04N 21/8545* (2013.01); *H04N 21/8586* (2013.01); *H04L 65/604* (2013.01); *H04L 67/34* (2013.01)

USPC .......................................... 709/226; 709/231

(58) Field of Classification Search
CPC ... H01L 12/2812; H01L 67/34; H01L 65/604; H04N 21/235; H04N 21/2368; H04N 21/2389; H04N 21/435; H04N 21/8173; H04N 21/8545; H04N 21/8586; H04N 21/4385
USPC ................................... 709/226, 231
See application file for complete search history.

(56) References Cited

U.S. PATENT DOCUMENTS

| | | | | |
|---|---|---|---|---|
| 7,630,615 | B2 * | 12/2009 | Ikeda et al. ................... | 386/235 |
| 7,861,280 | B2 * | 12/2010 | Chung .......................... | 725/142 |

(Continued)

FOREIGN PATENT DOCUMENTS

| | | |
|---|---|---|
| JP | 2000-078544 A | 3/2000 |
| JP | 2005-197992 A | 7/2005 |

OTHER PUBLICATIONS

Communication from the Japanese Patent Office dated Jan. 28, 2014, in a counterpart Japanese application No. 2010-010018.

(Continued)

*Primary Examiner* — David X Yi
(74) *Attorney, Agent, or Firm* — Sughrue Mion, PLLC

(57) ABSTRACT

Provided are a content information providing method and apparatus. Application information about application data is obtained from broadcasting data. An application resource is generated based on the application information. The application resource is added to a content item. Link information between the application resource and an audio/video (AV) resource is added to attribute information of the content item. The content information including the attribute information is provided to a content reproducing apparatus.

16 Claims, 8 Drawing Sheets

(51) Int. Cl.
*H04N 21/81* (2011.01)
*H04N 21/8545* (2011.01)
*H04N 21/858* (2011.01)
*H04L 29/06* (2006.01)
*H04L 29/08* (2006.01)

(56) References Cited

U.S. PATENT DOCUMENTS

| 8,437,625 | B2* | 5/2013 | Ikeda et al. | 386/353 |
| 2002/0186485 | A1* | 12/2002 | Cho et al. | 360/1 |
| 2003/0217369 | A1* | 11/2003 | Heredia | 725/152 |
| 2006/0020950 | A1* | 1/2006 | Ladd et al. | 719/328 |
| 2006/0280434 | A1* | 12/2006 | Suzuki et al. | 386/83 |
| 2007/0071396 | A1* | 3/2007 | Tanaka et al. | 386/68 |
| 2007/0157263 | A1* | 7/2007 | Horii et al. | 725/87 |
| 2008/0072274 | A1* | 3/2008 | Oh et al. | 725/136 |
| 2008/0094509 | A1* | 4/2008 | Lee et al. | 348/564 |
| 2009/0106801 | A1* | 4/2009 | Horii | 725/91 |

OTHER PUBLICATIONS

Communication, Issued by the Japanese Patent Office, Dated Nov. 25, 2014, In counterpart Japanese application No. 2010-010018.

* cited by examiner

CONTENT INFORMATION PROVIDING AND REPRODUCING METHOD AND APPARATUS

CROSS-REFERENCE TO RELATED PATENT APPLICATION

This application claims priority from Korean Patent Application No. 10-2009-0005158, filed Jan. 21, 2009, in the Korean Intellectual Property Office, the disclosure of which is incorporated herein in its entirety by reference.

BACKGROUND OF THE INVENTION

1. Field of the Invention

Apparatuses and methods consistent with the present invention relate to sharing and processing content between a plurality of devices connected to a network, and more particularly, to providing and reproducing content information that provide an application that is linked with an audio/video (AV) stream to a network and executing the application.

2. Description of the Related Art

In general, data broadcasting provides broadcasting programs, general information related to the broadcasting programs, life information, internet access, electronic commerce, bi-directional entertainment, and the like by using a broadcasting network, such as a terrestrial network, a satellite network, or a cable network. Currently, OpenCable Application Platform (OCAP) is one of the international data broadcasting standards.

The OCAP may share content between devices via a home network extension Application Program Interface (API).

However, OCAP-home network extension (HNE) does not provide a technology for providing an application as content.

Accordingly, a solution is required to share an application between devices in a home network.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a content information providing and reproducing method and apparatus that provide an application linked with an AV stream to a network and execute the application received via the network in an OCAP-HNE environment.

According to an exemplary aspect of the present invention, there is provided a content information providing method including: obtaining application information about application data from broadcasting data; generating an application resource based on the application information; adding the application resource to a content item; and adding link information between the application resource and an AV resource to attribute information of the content item.

According to another exemplary aspect of the present invention, there is provided a content information providing method including: obtaining application information from broadcasting data; generating an application resource based on the application information; and adding the application resource to each of a content item and attribute information of the content item.

According to another exemplary aspect of the present invention, there is provided a content information providing method including: obtaining application information from broadcasting data; generating a first content item indicating an application, based on the application information; generating a second content item including an AV resource; and adding link information between the first content item and the AV resource to the second content item.

According to another exemplary aspect of the present invention, there is provided a content information providing method including: obtaining application information from broadcasting data; generating a content container based on the application information; generating a content item including an AV resource; and adding link information between the content container and the AV resource to attribute information of the content item.

According to another exemplary aspect of the present invention, there is provided a content information reproducing method including: obtaining a content item from content information; checking whether an application resource exists in the content item; obtaining application information from the application resource, if the application resource exists in the content item; and executing an application of the application resource linked to an AV resource, by referring to the application information.

According to another exemplary aspect of the present invention, there is provided a content information reproducing method including: obtaining a content item from content information; checking whether link information between an AV resource and an application resource exists in the content item; obtaining an application linked with the AV resource from the content item, if the link information between the AV resource and the application resource exists in the content item; obtaining application information from the content item; and executing the application linked to the AV resource, by referring to the application information.

According to another exemplary aspect of the present invention, there is provided a content information providing apparatus including: a content information generating unit for generating an application resource based on application information, adding the application resource to a content item, and adding link information between the application resource and an AV resource to attribute information of the content item; and a content transmitting unit for transmitting content information generated by the content information generating unit to a network via a predetermined communication protocol.

According to another exemplary aspect of the present invention, there is provided a content information reproducing apparatus including: a content receiving unit for receiving content information via a network; and a content information processing unit for obtaining a content item by parsing the content information received by the content receiving unit, and executing an application that is linked with an AV stream, by using link information between an application resource and an AV resource, wherein the link information is provided from the content item.

BRIEF DESCRIPTION OF THE DRAWINGS

The present invention will become apparent and more readily appreciated from the following description of exemplary embodiments, with reference to the accompanying drawings, in which.

DETAILED DESCRIPTION OF EXEMPLARY EMBODIMENTS

Figure 1:
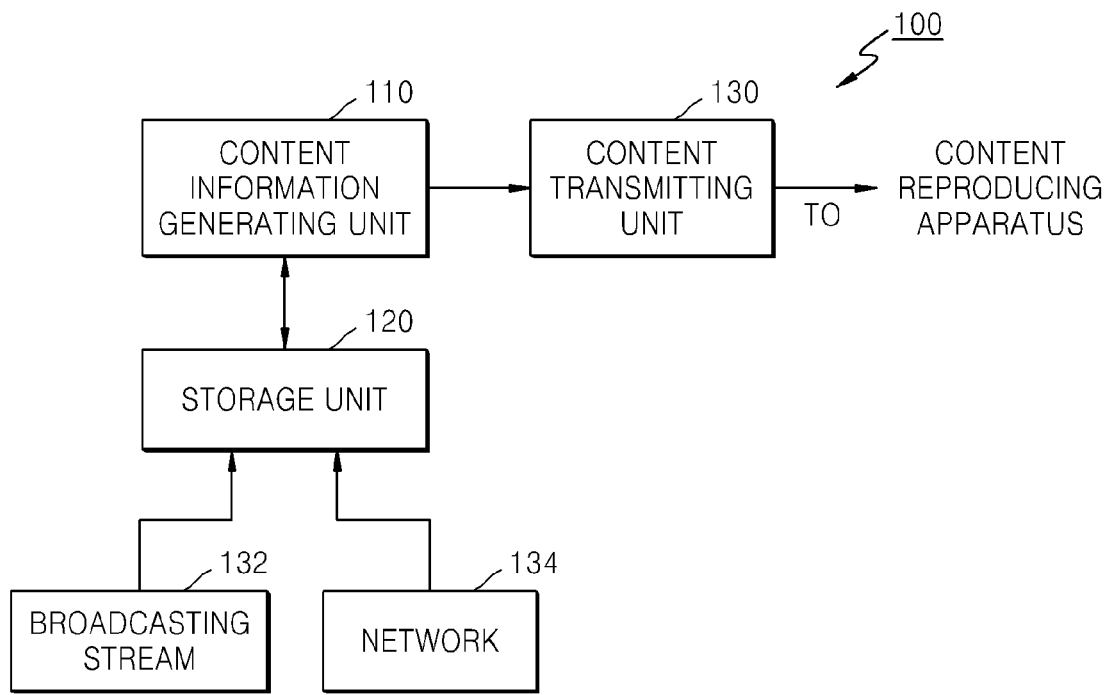
FIG. 1 is a block diagram of a content information providing apparatus according to an exemplary embodiment of the present invention.

Exemplary embodiments of the present invention are described in greater detail below with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a block diagram of a content information providing apparatus according to an exemplary embodiment of the present invention.

The content information providing apparatus 100 of FIG. 1 includes a content information generating unit 110, a storage unit 120, and a content transmitting unit 130.

The content information generating unit 110 generates an application resource according to application information that is received via a broadcasting stream 132 or a network 134, and adds the generated application resource to a content item. For example, the content item is a unit indicating content to be shared between devices connected to the network. The content item may have various types of content including an audio_item, a video_item, an application_item, and the like, and may have one or more content resources. For example, the content resources indicate media streams and/or media files. The OCAP-HNE may provide content resources including an audio resource, a data resource, and a video resource.

Also, the content information generating unit 110 adds a link information between the added application resource and a specific multimedia resource to the attribute information of the content item.

The storage unit 120 stores multimedia streams or application data, which may be received via the broadcasting stream or the network.

The content transmitting unit 130 transmits content information including a content item generated by the content information generating unit 110 to a content information reproducing apparatus 140 via a communication protocol, such as hypertext transport protocol (HTTP).

Figure 2:
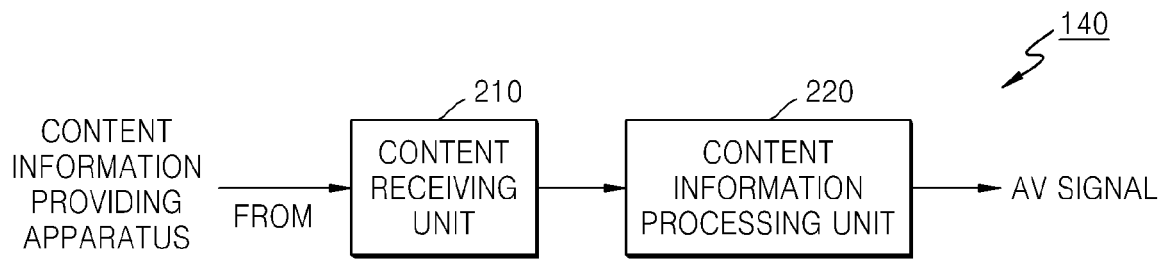
FIG. 2 is a block diagram of a content information reproducing apparatus according to another exemplary embodiment of the present invention.

FIG. 2 is a block diagram of a content information reproducing apparatus 140 according to another exemplary embodiment of the present invention.

The content information reproducing apparatus 140 of FIG. 2 includes a content receiving unit 210 and a content information processing unit 220.

The content receiving unit 210 receives content information from a content information providing apparatus 100 via a network.

The content information processing unit 220 parses the content information received by the content receiving unit 210, extracts a content item, and, if the link information between an application resource and a specific multimedia resource exists in the extracted content item, executes an application linked with a multimedia stream by using the link information between the application resource and the specific multimedia resource. The specific multimedia resource may be an AV resource.

Then, the content information processing unit 220 generates an AV signal by executing an application related to the application resource.

Figure 3A:
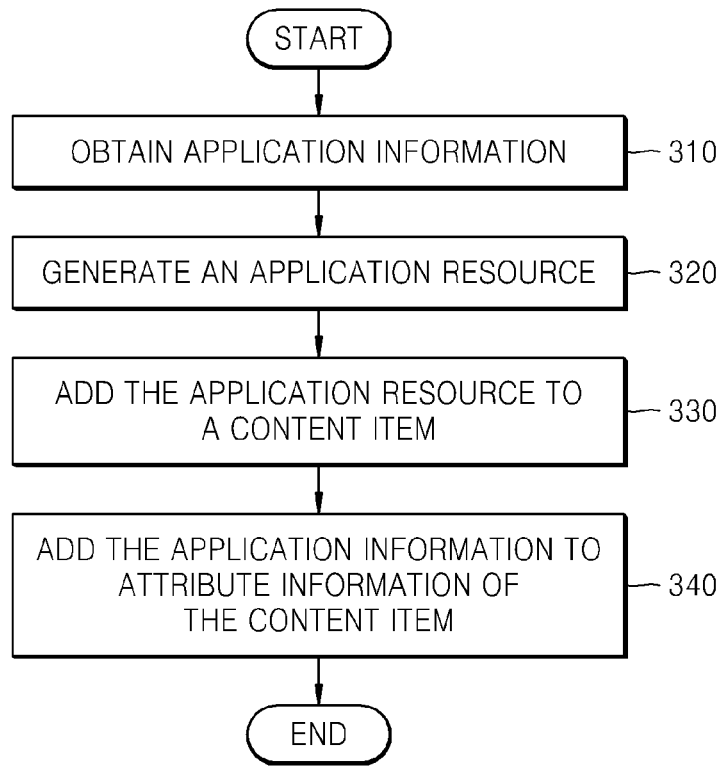
FIG. 3A is a flowchart of a content information providing method, according to an exemplary embodiment of the present invention.

FIG. 3A is a flowchart of a content information providing method, according to an exemplary embodiment of the present invention.

Application data and multimedia data such as the AV data are respectively stored in separate areas of a memory. In a content item, audio resources and video resources are defined according to the type of the content in the content item.

Information about an application is obtained from a broadcasting stream or a network (operation 310). The application information may include application identification (ID), application type, or application size.

An application resource is generated based on the application information (operation 320).

The generated application resource is added to the content item (operation 330).

After that, the application information is added to the attribute information of the content item (operation 340).

Figure 3B:
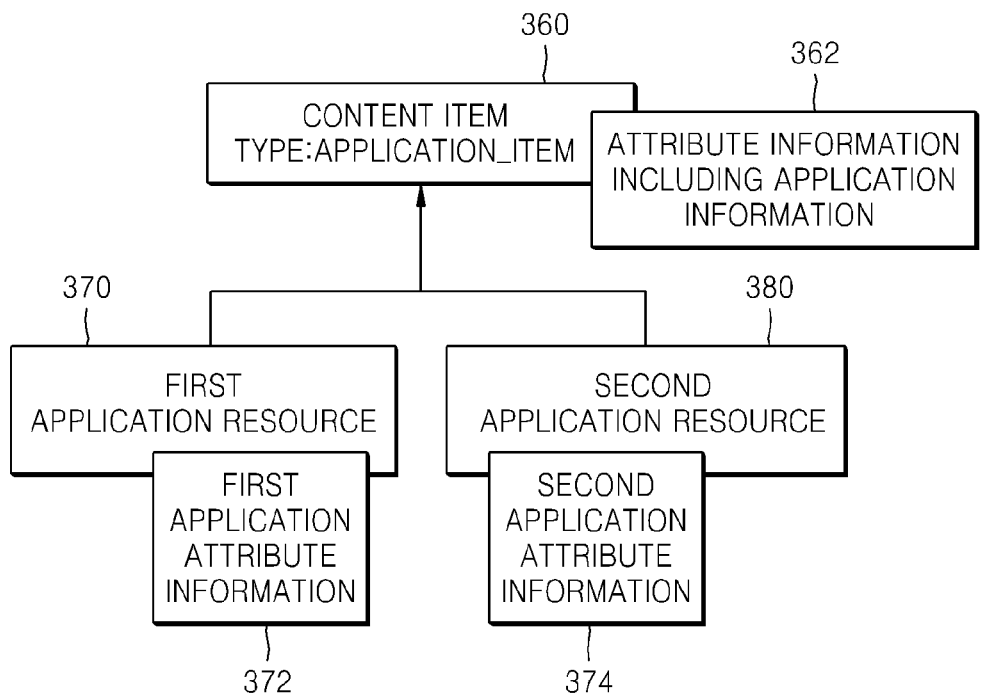
FIG. 3B is a configuration diagram of content information generated by the content information providing method of FIG. 3A.

FIG. 3B is a configuration diagram of an exemplary content information generated by the content information providing method of FIG. 3A.

Referring to FIG. 3B, a content item 360 includes a first application resource 370 and a second application resource 380. In the content item 360, an "application_item" is defined as a content type. The attribute information including application information 362 is defined.

Also, first application attribute information 372 and second application attribute information 374 are respectively set in the first application resource 370 and the second application resource 380. For example, the first and second application attribute information 372 and 374 may be directly provided as metadata or may be linked to metadata that is stored in a specific area of a memory, by using a link information.

Figure 4A:
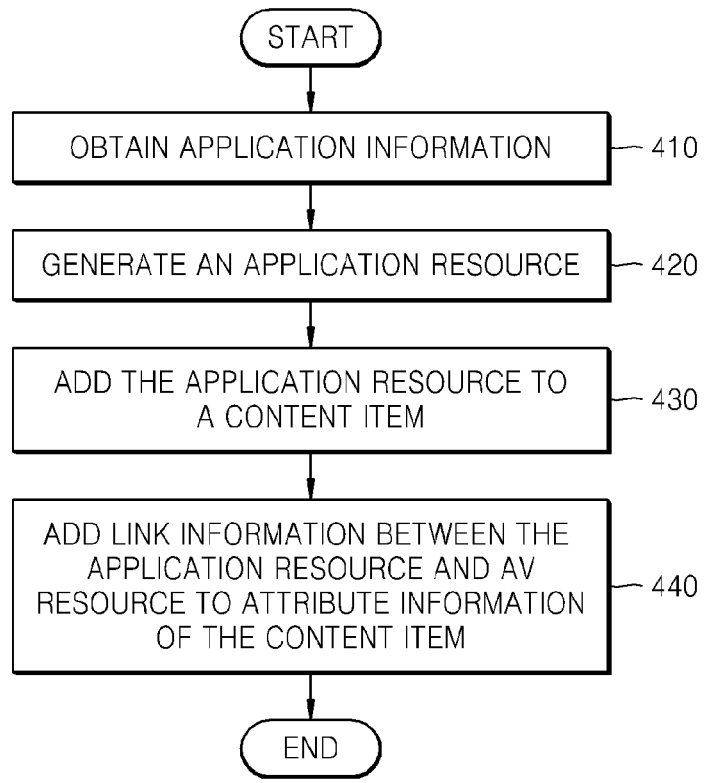
FIG. 4A is a flowchart of a content information providing method, according to another exemplary embodiment of the present invention.

FIG. 4A is a flowchart of a content information providing method, according to another exemplary embodiment of the present invention.

Application data and multimedia data such as the AV data are respectively stored in the separate areas of a memory. In a content item, audio resources and video resources are defined according to the type of content in the content item.

Application information is obtained from a broadcasting stream or a network (operation 410).

After that, an application resource is generated based on the application information (operation 420).

The generated application resource is added to the content item (operation 430).

After that, a link information between the application resource and the AV resource is added to the attribute information of the content item (operation 440). The link information between the application resource and the AV resource may include lifecycle management information about the application, such as an execution, termination, and download of the application, application update information at a reproduction time of the AV resource, application automatic start information, and the like.

Eventually, when the AV resource is reproduced, the application may be executed, linked to the AV resource.

Figure 4B:
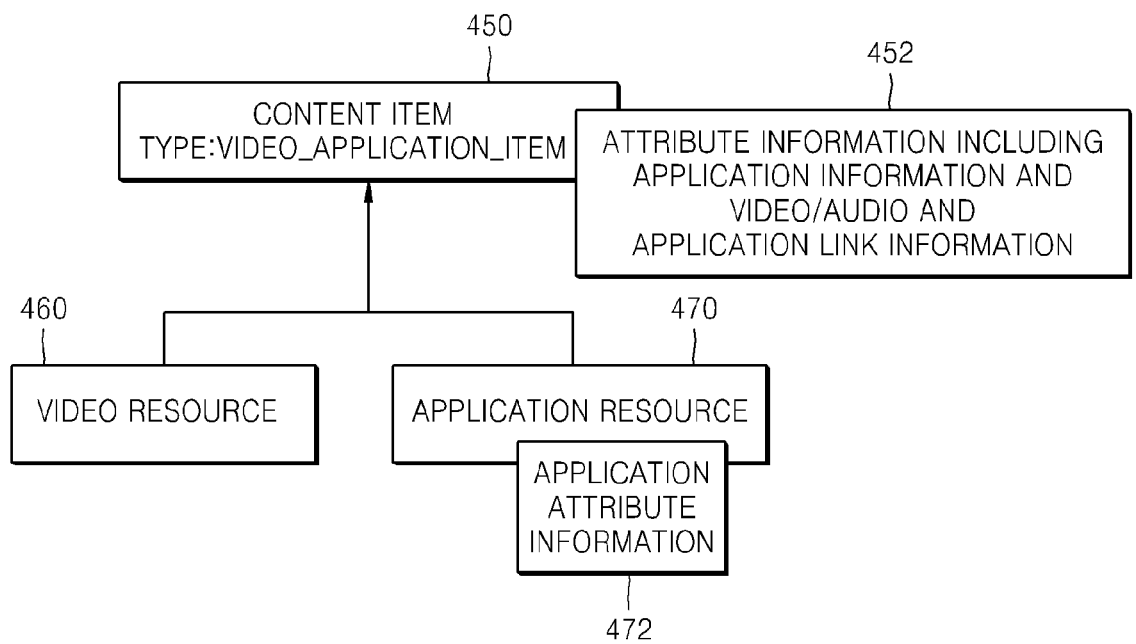
FIG. 4B is a configuration diagram of content information generated by the content information providing method of FIG. 4A.

FIG. 4B is a configuration diagram of the content information generated by the content information providing method of FIG. 4A.

As shown in FIG. 4B, a content item 450 includes a video resource 460 and the added application resource 470. In the content item 450, a "video_application_item" is defined as a content type. The attribute information including application information and video and/or audio and application link information 452 is defined.

Also, the application attribute information 472, such as an application information table (AIT) and an application management table (AMT), is set in the application resource 470.

Figure 4C:
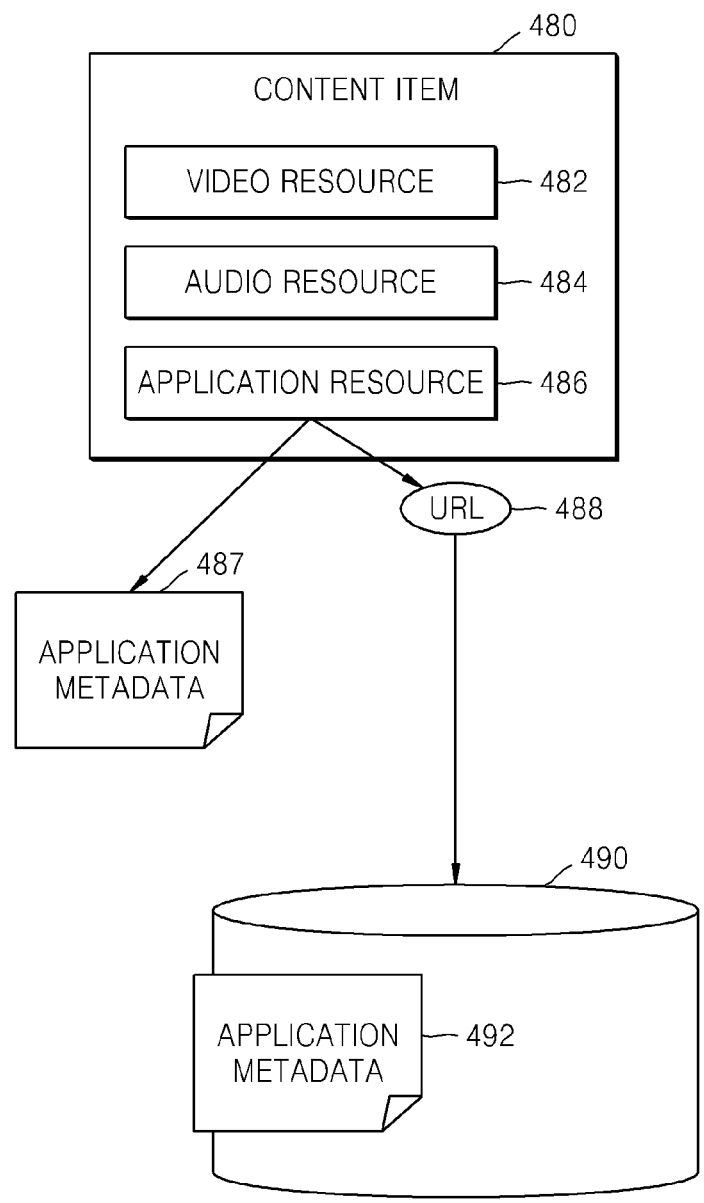
FIG. 4C is a diagram for describing a procedure in which application attribute information of FIG. 4B is provided.

FIG. 4C is a diagram illustrating a procedure in which the application attribute information 472 of FIG. 4B is provided.

Referring to FIG. 4C, a content item 480 includes a video resource 482, an audio resource 484, and an application resource 486.

The application attribute information 472 of the application resource 486 may be directly provided as an application metadata 487 or may be linked to an application metadata 492 stored in a specific area of a memory 490, by using the link information 488 such as a uniform resource locator (URL) or a uniform resource identifier (URI).

In addition, when an application and an AV stream are provided as a transport stream (TS), the TS may be presented by using an application resource.

Figure 5A:
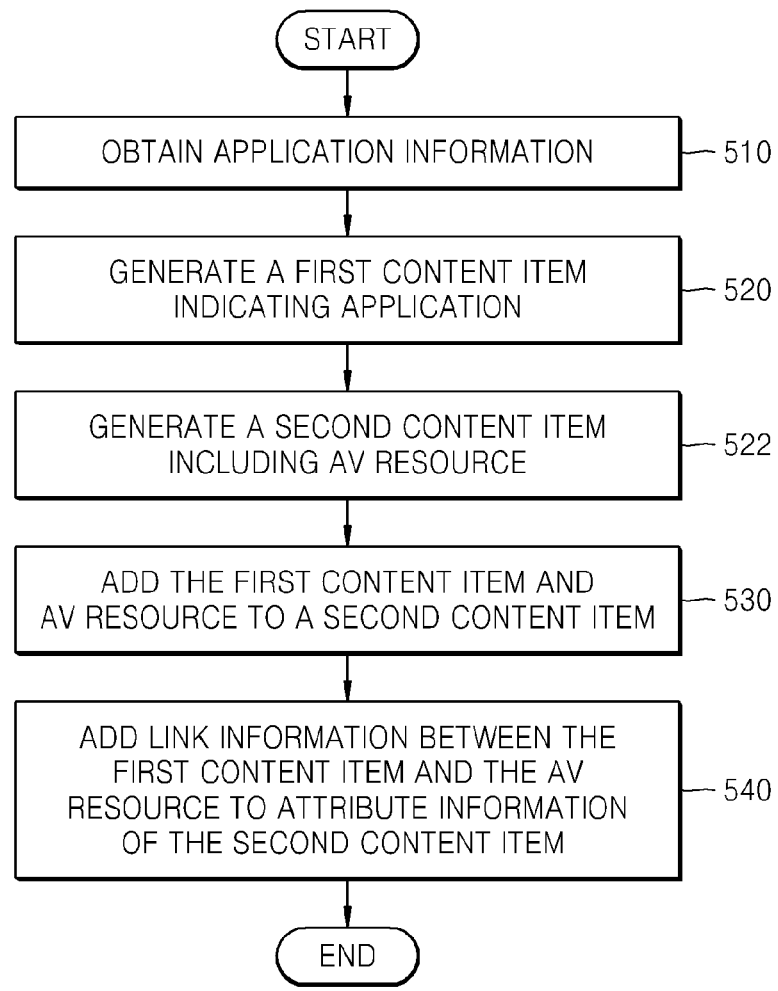
FIG. 5A is a flowchart of a content information providing method, according to another exemplary embodiment of the present invention.

FIG. 5A is a flowchart of a content information providing method, according to another exemplary embodiment of the present invention.

Application data and multimedia data such as the AV data are respectively stored in the separate areas of a memory. In a content item, audio resources and video resources are defined according to a content type.

Application information is obtained from broadcasting data that is transmitted from a broadcasting stream or a network (operation 510).

After that, a first content item indicating a specific application is generated based on the application information (operation 520). Then, a second content item including the AV resource is generated (operation 522).

The first content item is added to the second content item (operation 530).

After that, link information between the first content item and the AV resource of the second content item is added to the attribute information of the second content item (operation 540).

Figure 5B:
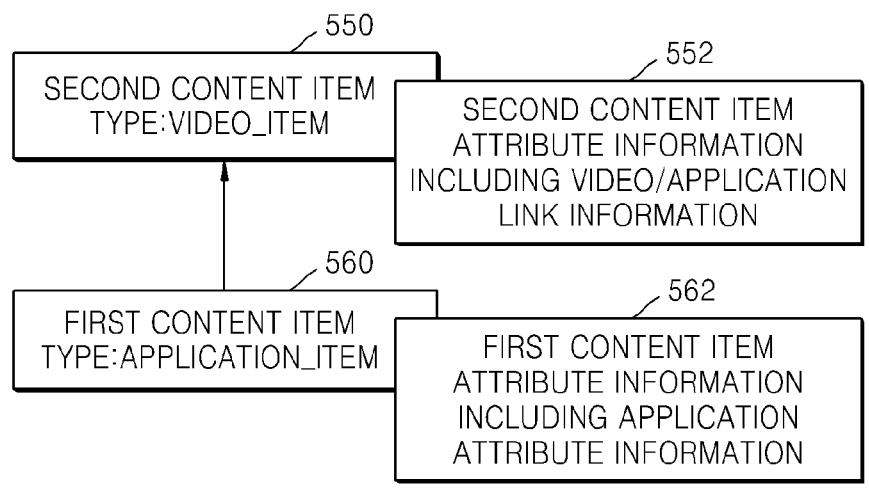
FIG. 5B is a configuration diagram of content information generated by the content information providing method of FIG. 5A.

FIG. 5B is a configuration diagram of the content information generated by the content information providing method of FIG. 5A.

Referring to FIG. 5B, a second content item 550 includes a first content item 560 indicating an application. The second content item 550 includes the AV resource. In the second content item 550, a "video_item" is defined as a content type. The attribute information including video/application related information 552 is defined. The video/application related information includes the video/application link information.

In the first content item 560, an "application_item" is defined as the content type. The application attribute information 562 is set.

For example, the application attribute information 562 may be directly provided as metadata or may be linked to metadata that is stored in a specific area of a memory, by using link information.

Figure 6A:
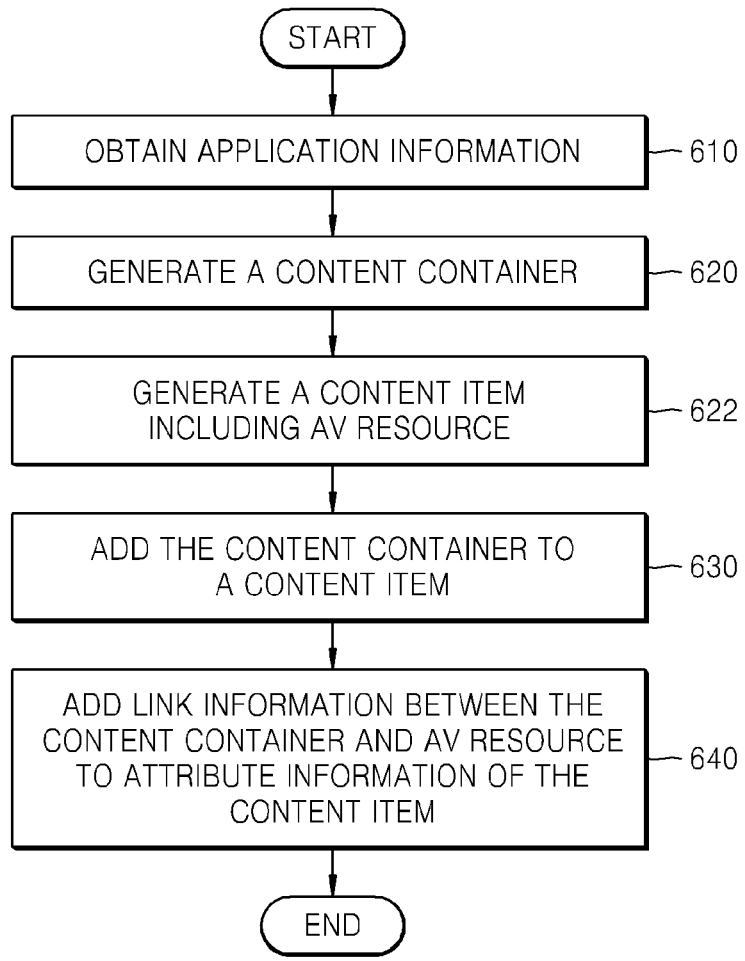
FIG. 6A is a flowchart of a content information providing method, according to another exemplary embodiment of the present invention.

FIG. 6A is a flowchart of a content information providing method, according to another exemplary embodiment of the present invention.

Application data and multimedia data such as the AV data are respectively stored in the separate areas of a memory. In a content item, audio resources and video resources are defined according to a content type.

Application information is obtained from broadcasting data that is transmitted from a broadcasting stream or a network (operation 610).

After that, a content container is generated based on the application information (operation 620). Then, a content item including an AV resource is generated (operation 622). For example, the content container may be provided with three types of the content container: "ALBUM_CONTAINER", "PERSON_CONTAINER", and "PLAYLIST_CONTAINER". The content container may gather and store files constituting an application. For example, the present exemplary embodiment provides the application via the content container designated as an "APPLICATION_CONTAINER" type. Also, the content container stores a plurality of pieces of the attribute information of the application. The content item may be a file constituting the application in the content container.

The generated content container is added to the content item (operation 630).

Then, a link information between the content container and the AV resource is added to the attribute information of the content item (operation 640).

The link information between the content container and the application includes information indicating the content container with the stored application to be linked with the content item.

Figure 6B:
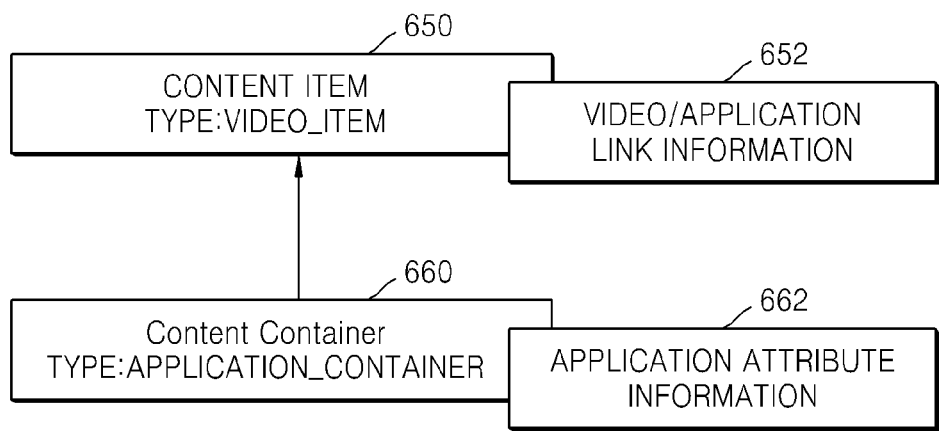
FIG. 6B is a configuration diagram of content information generated by the content information providing method of FIG. 6A.

FIG. 6B is a configuration diagram of the content information generated by the content information providing method of FIG. 6A.

Referring to FIG. 6B, a content item 650 includes an AV resource and a content container 660. In the content item 650, a "video_item" is defined as a content type. The attribute information 652 including video/application link information is defined.

In the content container 660, an "application_container" is defined as a content type and application attribute information 662 is set.

The application attribute information 662 may be directly provided as metadata or may be linked to metadata that is stored in a specific area of a memory, by using a link information.

Figure 7:
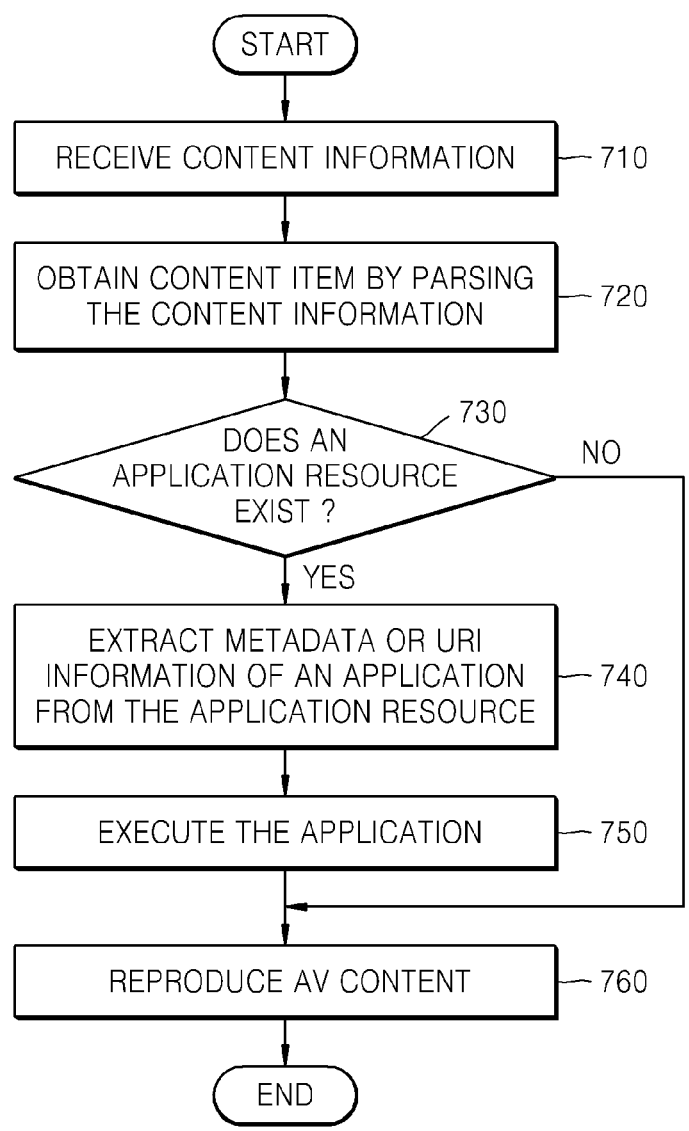
FIG. 7 is a flowchart of a content information reproducing method, according to another exemplary embodiment of the present invention.

FIG. 7 is a flowchart of a content information reproducing method, according to another exemplary embodiment of the present invention.

Content information that is transmitted from a content information providing apparatus 100 via a predetermined communication protocol is received (operation 710).

The content information, which is generated by HyperText Markup Language (HTML) or a JavaScript, is parsed so that a content item is extracted (operation 720). For example, the content item includes an application resource. Attribute information corresponding to the application information is defined in the content item. The application resource may include the attribute information, such as metadata or link information.

By referring to the attribute information of the content item, it is checked whether the application resource exists in the content item (operation 730).

If the application resource exists in the content item, the metadata or URI information corresponding to the attribute information of an application is extracted from the application resource (operation 740).

If the link information between an AV resource and the application resource does not exist in the content item, a specific AV content in the AV resource is reproduced.

After that, by referring to the metadata or the URI information of the application, the application linked to the AV resource is executed (operation 750). For example, the URI information indicates a remote AIT. However, if there is no need of setting information or the attribute information, which is necessary to drive the application, the URI information may directly indicate an initial executable file.

Then, the AV content linked to the application is reproduced (operation 760).

Figure 8:
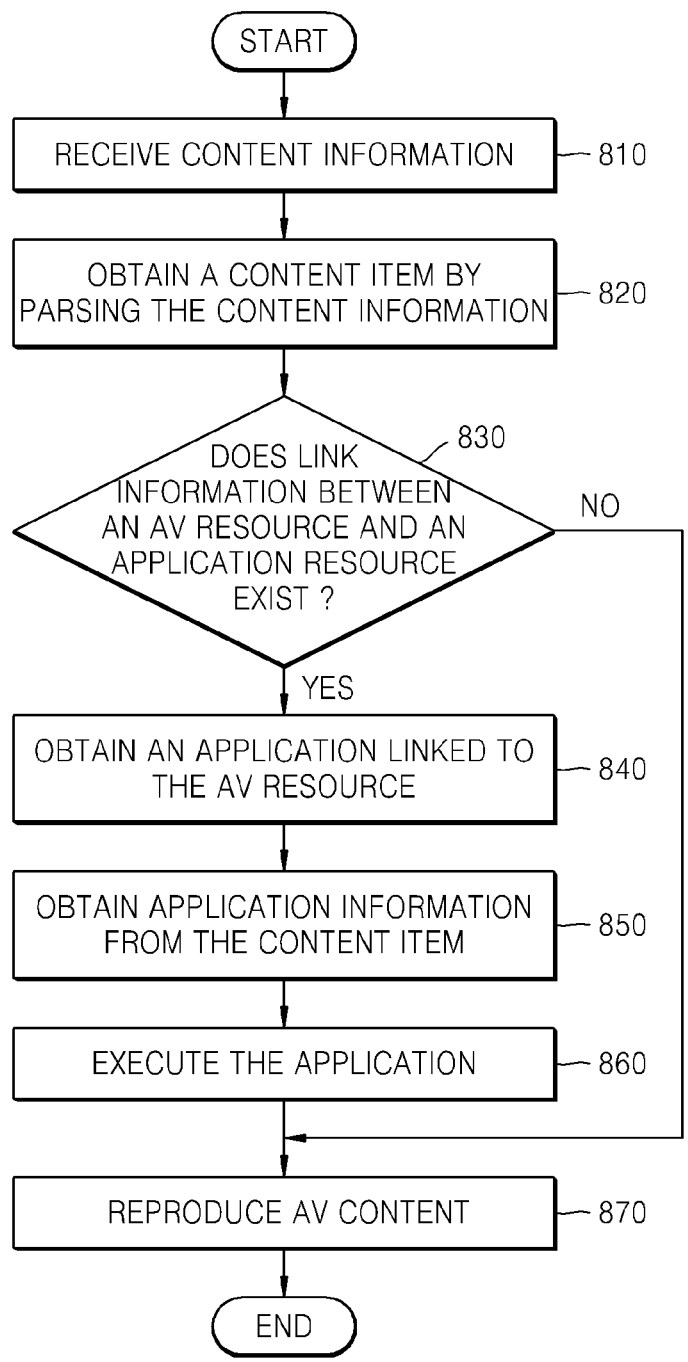
FIG. 8 is a flowchart of a content information reproducing method, according to another exemplary embodiment of the present invention.

FIG. 8 is a flowchart of a content information reproducing method, according to another exemplary embodiment of the present invention.

Content information, which is transmitted from a content information providing apparatus 100 via a predetermined communication protocol, is received (operation 810).

After that, the content information, which is generated by HTML or a JavaScript, is parsed and a content item is extracted (operation 820). The content item may include a video resource, an audio resource, and an application resource, and also includes attribute information corresponding to AV/application related information. The attribute information may include video/application link information. The application resource may include the attribute information, such as metadata or link information.

By referring to the attribute information of the content item, it is checked whether the link information between the AV resource and the application resource exists in the content item (operation 830).

If the link information between the AV resource and the application resource exists in the content item, the application linked to the AV resource is obtained from the content item (operation 840).

If the link information between the AV resource and the application resource does not exist in the content item, a specific AV content in the AV resource is reproduced.

After that, the metadata or URI information corresponding to attribute information of the application is obtained from the content item (operation 850).

By referring to the metadata or the URI information of the application, the application linked to the AV resource is executed (operation 860).

After that, the AV content linked to the application is reproduced (operation 870).

According to exemplary embodiments of the present invention, it is possible to share and execute an application between devices in the OCAP-HNE environment so that the application may be provided as the independent content. Also, the application may be reproduced in conjunction with the AV stream in the OCAP-HNE environment.

The invention can also be embodied as computer-readable codes on a computer-readable recording medium. The computer-readable recording medium may include any data storage device that can store data which can be thereafter read by a computer system. Examples of the computer-readable recording medium include read-only memory (ROM), random-access memory (RAM), CD-ROMs, magnetic tapes, hard disks, floppy disks, flash memory, optical data storage devices, etc. The computer-readable recording medium can also be distributed over network coupled computer systems so that the computer-readable code is stored and executed in a distributed fashion.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A content information providing method, the method comprising:
   obtaining application information about application data from broadcasting data;
   generating an application resource based on the application information;
   adding the application resource to a content item;
   adding link information between the application resource and an audio/video (AV) resource to attribute information of the content item, wherein application attribute information is provided in the application resource as link information to an application metadata stored in a memory, and wherein the link information between the application resource and the AV resource is used to obtain an application linked to the AV resource by a content reproducing apparatus; and
   providing content information comprising the attribute information having the added link information to the content reproducing apparatus.

2. The content information providing method of claim 1, wherein the content item is further added with a content type information defined as an AV stream and an application item.

3. The content information providing method of claim 1, wherein the link information between the application resource and the AV resource comprises:
   at least one of lifecycle management information of an application for the AV resource, and application update information at a reproduction time of the AV resource.

4. A content information providing method, the method comprising:
   obtaining application information from broadcasting data;
   generating an application resource based on the application information, wherein an application attribute information is provided in the application resource as a link information to metadata stored in a memory;

adding the application resource to a content item;
adding the application information to attribute information of the content item, wherein the application information is used to obtain an application of the application resource by a content reproducing apparatus; and
providing content information comprising the attribute information having the added application information to the content reproducing apparatus.

5. The content information providing method of claim 4, wherein the content item is further added with a content type information defined as an application item.

6. A content information providing method, the method comprising:
obtaining application information from broadcasting data;
generating a first content item indicating an application based on the application information, wherein application attribute information is set in the first content item as link information to an application metadata stored in a memory;
generating a second content item comprising an AV resource;
adding link information between the first content item and the AV resource to attribute information of the second content item, wherein the link information between the first content item and the AV resource is used to obtain the application linked with the AV resource by a content reproducing apparatus; and
providing content information comprising the attribute information having the added link information to the content reproducing apparatus.

7. The content information providing method of claim 6, wherein an application item, which is defined as a content type, is set in the first content item.

8. A content information providing method, the method comprising:
obtaining application information from broadcasting data;
generating a content container based on the application information, wherein application attribute information is set in the content container as link information to an application metadata stored in a memory;
generating a content item comprising an AV resource;
adding link information between the content container and the AV resource to attribute information of the content item, wherein the link information between the content container and the AV resource is used to obtain an application linked with the AV resource by a content reproducing apparatus; and
providing content information comprising the attribute information having the added link information to the content reproducing apparatus.

9. The content information providing method of claim 8, wherein the link information between the content container and the AV resource is a designation information for indicating the content container with a stored application to be linked with the content item.

10. The content information providing method of claim 8, further comprising:
defining attribute information corresponding to the application information in the content container.

11. A content information reproducing method, the method comprising:
obtaining a content item from content information provided by a content information providing apparatus;
checking whether an application resource exists in the content item;
if the application resource exists in the content item, obtaining application information from the application resource existed in the content item; and
executing an application of the application resource linked to an AV resource, by referring to the application information,
wherein application attribute information is provided in the application resource as link information to an application metadata stored in a memory,
wherein the obtaining of the application information comprises extracting link information of the application, and
wherein the link information is added to the application resource.

12. A content information reproducing method, the method comprising:
obtaining a content item from content information provided by a content information providing apparatus;
checking whether link information between an AV resource and an application resource exists in the content item;
obtaining an application linked with the AV resource from the content item, if the link information between the AV resource and the application resource exists in the content item;
obtaining application information from the content item; and
executing the application linked to the AV resource, by referring to the application information,
wherein application attribute information is provided in the application resource as link information to an application metadata stored in a memory, and
wherein the obtaining of the application information comprises extracting link information of the application from the content item.

13. A content information providing apparatus comprising:
a processor coupled to a memory storing instructions that are executed by the processor to generate an application resource based on application information, to add the application resource to a content item, and to add link information between the application resource and an AV resource to attribute information of the content item, wherein application attribute information is provided in the application resource as link information to an application metadata stored in a memory; and
a content transmitter which transmits content information including the content item to a network via a predetermined communication protocol,
wherein the link information between the application resource and the AV resource is used to obtain an application linked to the AV resource by a content reproducing apparatus.

14. A content information reproducing apparatus, comprising:
a content receiver which receives content information via a network; and
a processor coupled to a memory storing instructions that are executed by the processor to obtain a content item by parsing the content information, to check whether link information between an AV resource and an application resource exists in the content item, to obtain an application linked with the AV resource from the content item, if the link information between the AV resource and the application resource exists in the content item, to obtain application information from the content item and to execute the application that is linked with the AV resource, by using the link information between the application resource and the AV resource, wherein the link information is provided from the content item, wherein application attribute information is provided in the application resource as a link information to an application metadata stored in a memory, wherein the obtaining of the application information comprises extracting link information of the application from the content item.

15. A method comprising:

receiving application information about application data by a content information providing apparatus;

generating an application resource based on the received application information;

adding the generated application resource to a content item;

adding link information between the application resource and an AV resource to attribute information associated with the content item;

transmitting the attribute information having the added link information to a content reproducing apparatus;

obtaining the content item based on the received attribute information;

retrieving the link information from the content item;

obtaining the application and the application information based on the retrieved link information; and executing the application linked to the AV resource based on the obtained application information by the content reproducing apparatus.

16. The method of claim 15, further comprising:

determining an absence of the link information in the content item prior to retrieving the link information from the content item; and reproducing the AV content without obtaining and executing the application.

* * * * *